Figure 5:
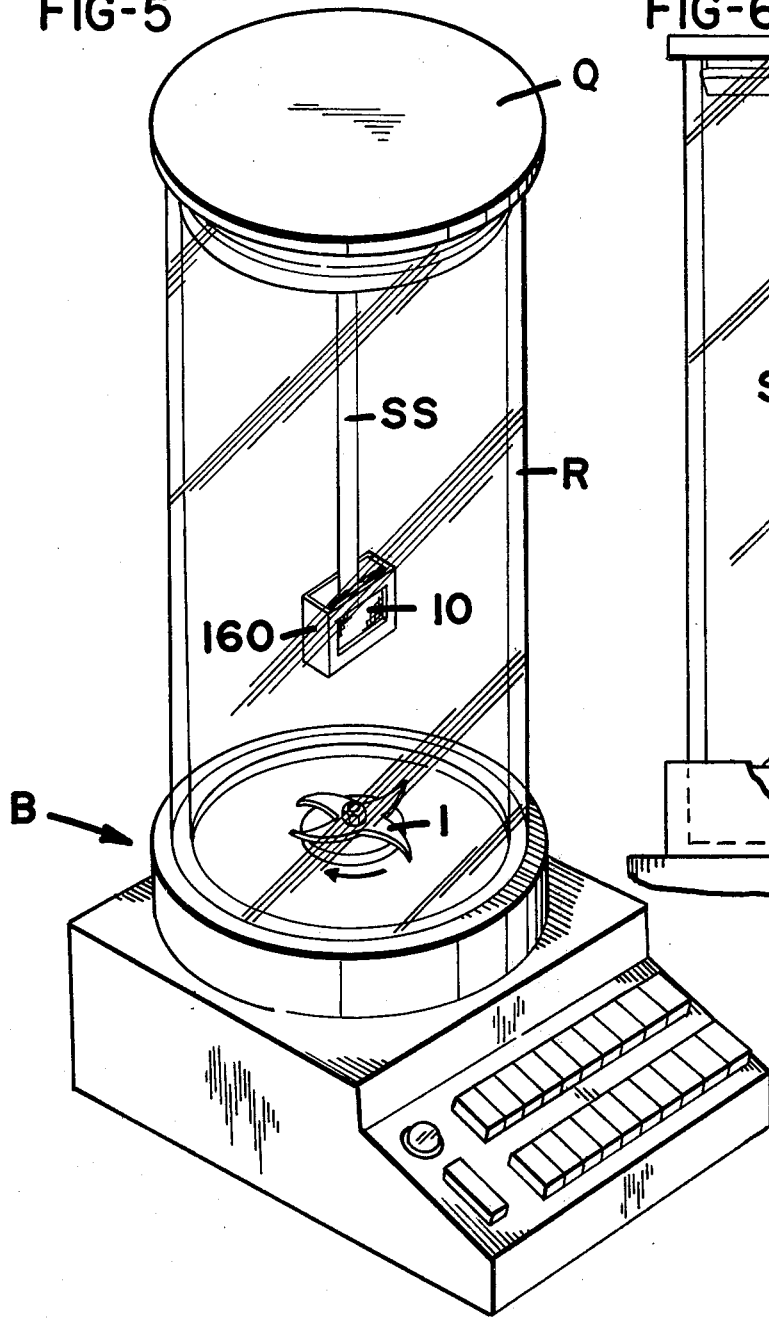
Figure 6:
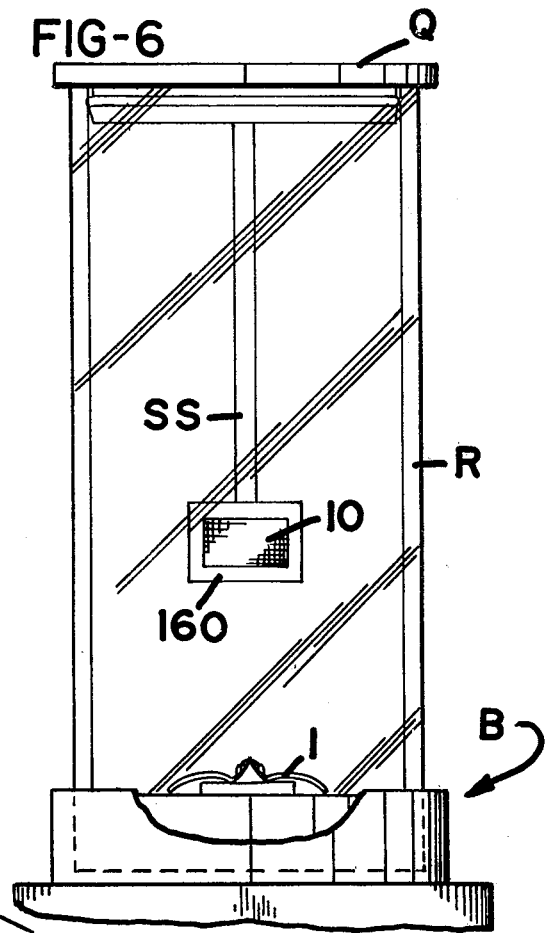

United States Patent [19]

Sway

[11] 4,211,649
[45] Jul. 8, 1980

[54] METHOD OF AND APPARATUS FOR TREATING WATER

[76] Inventor: Boris Sway, 7201 W. Aracoma Dr., Cincinnati, Ohio 45237

[21] Appl. No.: 914,569

[22] Filed: Jun. 12, 1978

[51] Int. Cl.² .............................................. C02B 1/16
[52] U.S. Cl. ............................... 210/37 R; 210/38 A; 210/267; 210/282; 210/416 DW
[58] Field of Search ..................... 210/19, 37 R, 37 B, 210/38 R, 38 A, 38 B, 38 C, 40, 77, 78, 196, 267, 280, 282, 287, 289, 360 A, 364–367, 380 R, 382–385, 388, 399, 416 DW; 366/349

[56] References Cited

U.S. PATENT DOCUMENTS

| 2,533,936 | 12/1950 | Holmes et al. | 210/289 |
| 2,562,735 | 7/1951 | Pick | 210/282 |
| 3,241,675 | 3/1966 | Pashaian et al. | 210/77 |
| 3,843,521 | 10/1974 | Zeff | 366/349 |

*Primary Examiner*—Ivars C. Cintins
*Attorney, Agent, or Firm*—Kinney and Schenk

[57] ABSTRACT

A housing or porous water-permeable material containing granular water-treatment particles is immersed in a quantity of water, and means are provided for effecting circulation of the water through the housing whereby certain chemicals are removed from the water.

13 Claims, 6 Drawing Figures

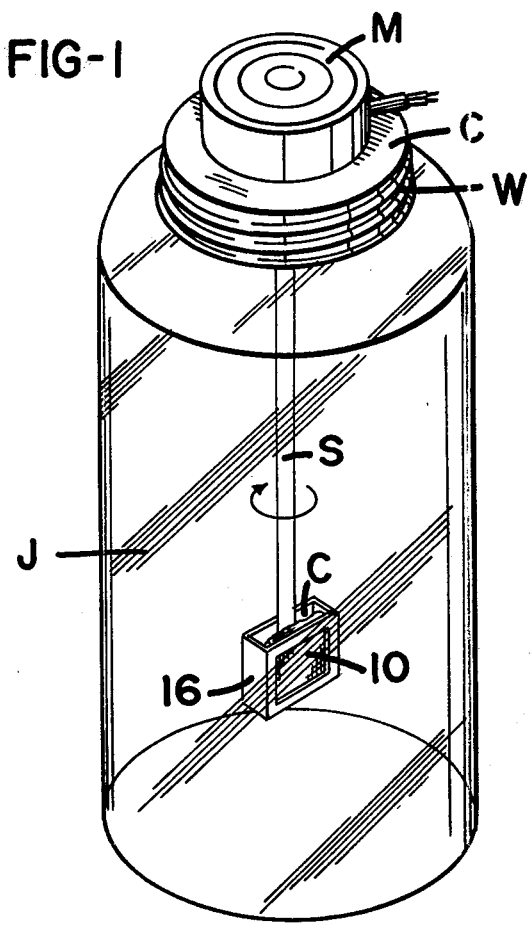
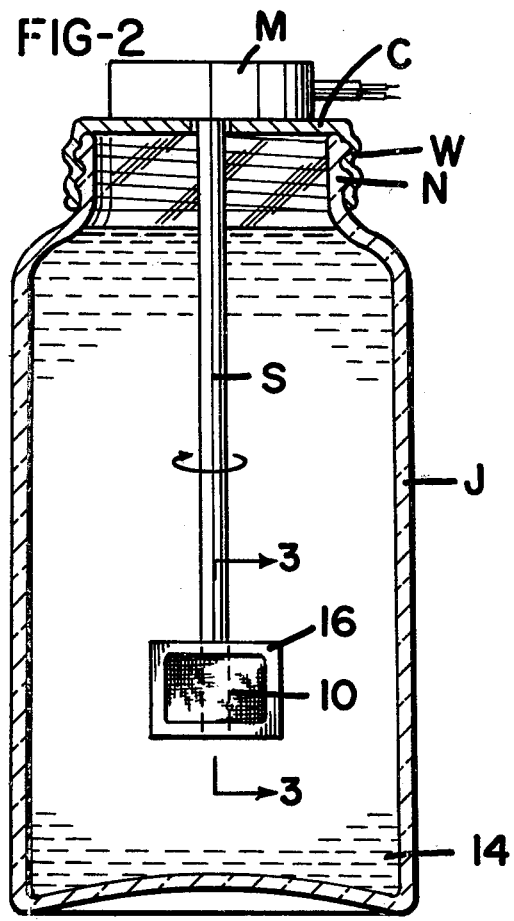
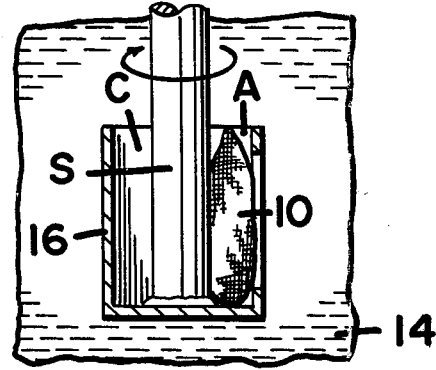
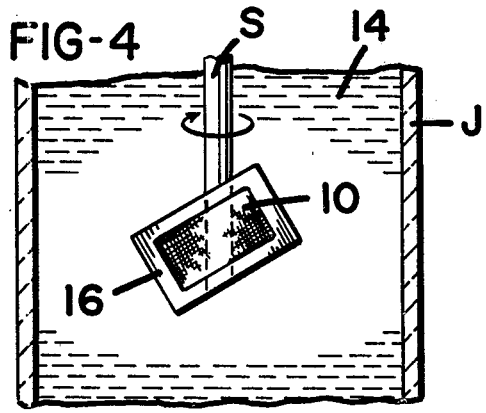

U.S. Patent Jul. 8, 1980 Sheet 2 of 2 4,211,649

2. An apparatus as called for in claim 1, wherein the continuous recirculation of the water within the vessel through said framework, housing and the material confined therein, is accomplished by mounting the shaft interiorly of the vessel against rotation relative thereto, and of imparting a circulatory motion to the water within the vessel by means of a rotatable impeller located adjacent the bottom of said vessel.

3. An apparatus as called for in claim 1, wherein the vessel is dimensioned to contain at least one quart of water-to-be-treated and wherein each housing contains about two grams of granular particles.

4. An apparatus as called for in claim 1, wherein the open framework defines a pair of individual housing-receptive compartments.

5. An apparatus as recited in claim 1 wherein said granular material is from 10 to 60 mesh in size.

6. A method of improving the taste of tap water which comprises:
  (a) supplying a predetermined quantity of water into a container;
  (b) submerging a predetermined quantity of granular material characterized by its ability to substantially absorb those components of water which contribute to its undesirable taste and which is loosely confined within a water pervious housing into the predetermined quantity of water;
  (c) effectuating relative rotary movement between the water and the granular material while the water is in contact with the granular material so as to provide continuous recirculation of the water relative to the granular material by rotating the water-pervious housing containing the granular material while fully immersed in the water for a period of time sufficient to effect substantial absorption of those ingredients of the water which are responsible for its undesirable taste; and
  (d) thereafter removing the predetermined quantity of water from the container.

7. A method, as called for in claim 6, wherein the water-pervious housing is suspended within a closed vessel.

8. A method, as called for in claim 6, wherein the water-pervious housing contaning the granular material is suspended interiorly of a vessel containing the water and wherein said water is agitated for effecting continuous recirculation thereof through said housing and the material contained therein.

9. A method, as called for in claim 8, wherein about two grams of granular material is confined within the water-pervious housing, wherein said amount of granular material will treat up to 10 gallons of water.

10. A method according to claim 6 wherein the granular material is further characterized by its inherent ability to remove substantially all of the anions and cations from the water, wherein said granular material comprises deionizing resins which are loosely confined within said water-pervious housing.

11. A method, as called for in claim 10, wherein the deionizing resins are also characterized by their inherent ability to substantially reduce the hardness of the water.

12. An apparatus for treating a given quantity of tap water for improving the taste thereof and removing undesirable ions therefrom which comprises:
  (a) an open top vessel for receiving a quantity of water-to-be-treated;
  (b) a motor driven impeller rotatably supported on the bottom of the vessel and being operative to continuously circulate water in the vessel;
  (c) a shaft suspended from the top of the vessel and extending axially into the vessel;
  (d) at least one water-pervious housing which contains a quantity of granular material characterized by its ability to absorb those components of the water which contribute to its off-taste or which remove the anions and cations from the water; and
  (e) an open framework secured to and carried by said shaft for removably receiving the housing, said framework positioning the water-pervious housing above the impeller such that water continuously recirculated by the impeller will continuously pass through the water-pervious housing whereby those ingredients of the water which are responsible for its undesirable taste or anions and cations will be absorbed.

13. A method of improving the taste of tap water which comprises:
  (a) supplying a predetermined quantity of water into a container;
  (b) submerging a predetermined quantity of granular material characterized by its ability to substantially absorb those components of water which contribute to its undesirable taste and which is loosely confined within a water pervious housing into the predetermined quantity of water;
  (c) effectuating relative rotary movement between the water and the granular material while the water is in contact with the granular material so as to provide continuous recirculation of the water relative to the granular material by effectuating rotation of an impeller located at the bottom of the container to continuously recirculate water in the container and suspending the water-pervious housing from the top of the container in the flow path of the recirculating water for a period of time sufficient to effect substantial absorption by the granular material of those ingredients of the water which are responsible for its undesirable taste.

* * * * *

United States Patent [19]

Thomas

[11] 4,211,650
[45] Jul. 8, 1980

[54] WATER RECLAMATION PROCESS

[76] Inventor: Robert C. Thomas, 3740 Campus Dr., Newport Beach, Calif. 92660

[21] Appl. No.: 935,680

[22] Filed: Aug. 21, 1978

Related U.S. Application Data

[63] Continuation of Ser. No. 575,381, Jun. 9, 1975, abandoned.

[51] Int. Cl.² ............................ C02B 1/20; C02C 5/02
[52] U.S. Cl. .................................... 210/44; 210/54; 210/82
[58] Field of Search ............ 210/42 R, 44, 49, 50–54, 210/60, 80, 82, 167, 221 P, 97, 290

[56] References Cited

U.S. PATENT DOCUMENTS

| | | | |
|---|---|---|---|
| 3,171,801 | 3/1965 | Rice et al. | 210/52 |
| 3,192,155 | 6/1965 | Bready et al. | 210/44 |
| 3,321,649 | 5/1967 | De Benedictis et al. | 210/54 |
| 3,764,013 | 10/1973 | Eisenmann | 210/44 |
| 3,772,190 | 11/1973 | Eisenmann | 210/44 |
| 3,841,116 | 10/1974 | Klein et al. | 210/167 |

OTHER PUBLICATIONS

Grieves et al., "Treating Laundry Wastes by Foam Separation", JWPCF, Mar. 1973, pp. 470–479.

*Primary Examiner*—Charles N. Hart
*Assistant Examiner*—Peter A. Hruskoci
*Attorney, Agent, or Firm*—Christie, Parker & Hale

[57] ABSTRACT

Dirty process water is collected from a process unit and introduced into a raw water holding tank. Water from the tank is passed at a uniform rate through a flotation cell where solids are frothed by flocculation and aeration and removed. The flocculating agent is a short chain cationic polymer. The water is then introduced into a treated water holding tank where it is withdrawn at a uniform rate and filtered to remove more solids. The filtered water is stored in a filtered water storage vessel for its use in the process facility. Heat exchange keeps the filtered water at required temperature. Water discharged from the system to a sanitary sewer may have various degrees of purity.

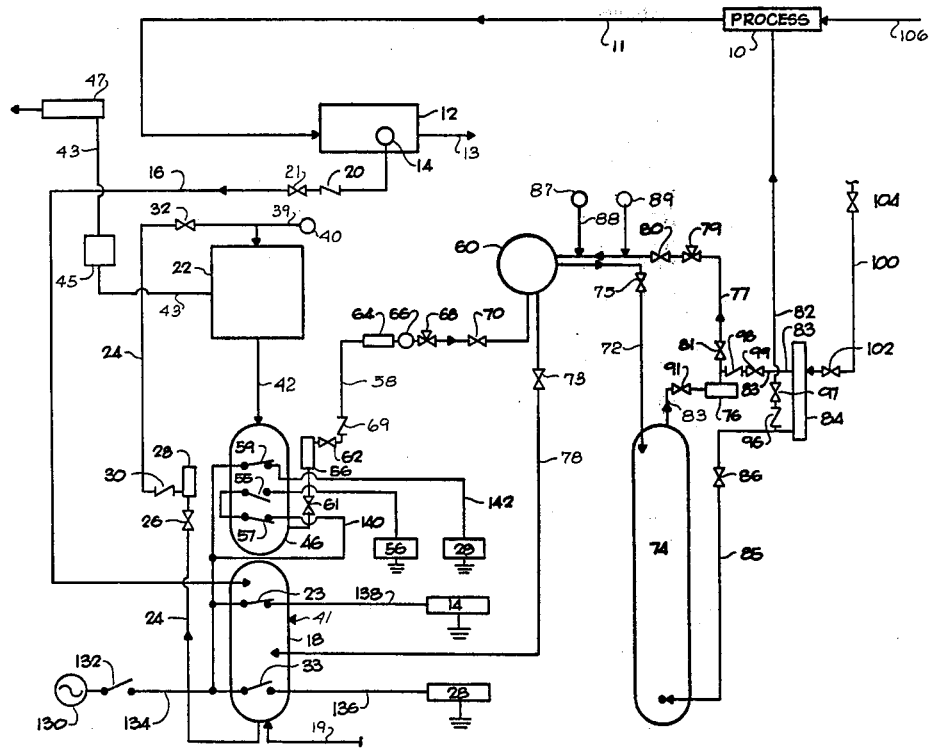

20 Claims, 4 Drawing Figures